United States Patent [19]
Sanada

[11] Patent Number: 5,909,366
[45] Date of Patent: Jun. 1, 1999

[54] CONTROLLER FOR POWER TRANSDUCERS

[75] Inventor: Kazunori Sanada, Tokyo, Japan

[73] Assignee: Mitsubishi Denki Kabushiki Kaisha, Tokyo, Japan

[21] Appl. No.: 08/879,614

[22] Filed: Jun. 20, 1997

[30] Foreign Application Priority Data

Feb. 5, 1997 [JP] Japan .................................. 9-022418

[51] Int. Cl.⁶ .............................................. H02M 7/515
[52] U.S. Cl. ............................................... 363/98; 363/17
[58] Field of Search ................................ 363/17, 96, 97, 363/98

[56] References Cited

U.S. PATENT DOCUMENTS

| | | | |
|---|---|---|---|
| 5,047,910 | 9/1991 | Levran et al. | 363/98 |
| 5,148,361 | 9/1992 | Braun et al. | 363/98 |
| 5,369,353 | 11/1994 | Erdman | 363/98 |
| 5,373,223 | 12/1994 | Akagi et al. | 363/98 |
| 5,400,240 | 3/1995 | Araki | 363/97 |
| 5,502,360 | 3/1996 | Kerkman et al. | 363/97 |
| 5,648,894 | 7/1997 | DeDoncker et al. | 363/39 |
| 5,677,606 | 10/1997 | Otake | 361/31 |
| 5,729,449 | 3/1998 | Takada et al. | 363/98 |

FOREIGN PATENT DOCUMENTS 6 38538   2/1994   Japan .

OTHER PUBLICATIONS

"A Matrix Technique Used for Configuring Non–Interference Control System for PWM Inverters". Japan Society for Power Electronics, vol. 14 (pp. 128–137).

*Primary Examiner*—Peter S. Wong
*Assistant Examiner*—Derek J. Jardieu
*Attorney, Agent, or Firm*—Leydig, Voit & Mayer, Ltd.

[57] ABSTRACT

A controller for controlling power transducers to maintain a balanced three-phase output voltage with no influence on current control even when an unbalanced load is connected to a three-phase output of an inverter of the power transducer. The controller provides a stable high-precision three-phase voltage to a load by suppressing higher harmonic voltage components even when a non-linear load is connected. The controller includes a voltage regulator circuit having, for each phase, circuitry calculating a mean value of the output voltage of the inverter. The controller detects and controls deviation in the output voltage from a single-phase mean voltage command. The controller determines a voltage deviation ratio from the deviation and multiplies each output voltage value by the voltage deviation ratio and uses the product as a new voltage detection value.

7 Claims, 8 Drawing Sheets

CONTROLLER FOR POWER TRANSDUCERS

BACKGROUND OF THE INVENTION

1. Field of the Invention

The present invention relates to a controller for power transducers such as UPS's (uniterruptable power source units) and SIV's which comprise DC/AC power transducer circuits (hereinafter referred to as inverters).

2. Description of Related Art

FIG. 8 is a block diagram illustrating a configuration of a control circuit for instantaneous control inverters which is described in "Composing Method for Moninteracting Control System for PWK Inverters by Matrix Technique" published as a collection of lecture monographs at 77th to 81st Power Electronics Research Meetings, Vol 14 (1988) p128–137. In this control circuit, a three-phase inverter output current supplied from an inverter 1 used as a power transducer is provided through current sensors 4, 5, and 6 to a filter 2 of inductors and capacitors. The inverter output passes through the filter 2 and is supplied to a load circuit 3.

Since three-phase inverter output current is detected as DC components by the current sensors 4, 5 and 6, this current is converted by a three-phase/dq axis converter circuit 105 into a d-axis current and a q-axis current which have a reference frequency and a normal phase.

Three-phase output voltages VLu, VLV and VLw supplied from the inverter 1 to the load circuit 3 are detected by a voltage sensor 7. The detected three-phase output voltages VLu, VLv and VLw are converted by a three-phase/dq axis converter circuit 114 into a d axis voltage VLd and a q axis voltage VLq having the reference frequency and the normal phase and input into a subtracter 116.

The subtracter 116 calculates deviations by subtracting a VLd command and a VLg command which are provided from a voltage command circuit 115 from the d axis voltage VLd and the q axis voltage VLq respectively having the reference frequency and the normal phase which are output from the three-phase/dq axis converter circuit 114.

On the basis of the deviations calculated by the subtracter 116, a voltage control circuit 100 outputs a current d command and a current q command so that VLu, VLv and VLw which are the output voltages of the inverter 1 are in accordance with a VLd command and a VLq command which are voltage commands. The current d command and current q command are restricted by a limiter 101 so as not to exceed a maximum passage current and output to a current control circuit 102. On the basis of the current d command and current q command as well as the d axis current and the q axis current having the reference frequency and normal phase, a current control circuit 102 outputs a current command for the inverter 1 to a dq axis/three phase converter circuit 103.

On the basis of the current command for the inverter 1, the dq axis/three-phase phase converter circuit 103 converts the d axis current and q axis current into a three-phase inverter output current command. In accordance with the three-phase inverter output current command, a gate signal generator circuit 104 generates a gate signal in a power semiconductor switching element of the inverter 1.

As clear from the configuration described above, the conventional control circuit for the instantaneous control inverters is configured to allow the voltage control circuit 100 to receive as inputs the deviations between the voltage commands and detected voltage values from the subtracter circuit 116, and output the current commands so that the output voltages are in accordance with the voltage commands. The current commands are restricted by the limiter 101 so as not to exceed the maximum passage voltage. The current control circuit 102 performs current control operations so that currents are supplied in accordance with the restricted current d command and current q command. As a result, the control circuit prevents a current supplied through the power semiconductor of the inverter 1 from exceeding the maximum passage current, thereby protecting the power semiconductor from damage.

When a single phase load is connected to the inverter control circuit which has the configuration described above, the voltage control circuit operates so as to cancel the three-phase unbalanced voltages. However, a steady-state deviation is produced due to a control response. In other words, an inverter of this kind has switching frequencies of 5 to 15 kHz and can respond only at 5000 to 15000 rad/sec. When a fundamental frequency is set at 60 Hz, for example, a harmonic of the eleventh order is at 660 Hz and approximately 4150 rad/sec, and response speed about five times as high, or at least 20750 rad/sec is necessary for control while following this harmonic. The conventional inverter control circuit has a Control response too slow for the harmonic and allows the steady-state deviation to be produced.

A conventional control circuit which corrects the three-phase unbalanced voltages, i.e. an inverter control circuit applied to a three-phase output voltage enhancing system of an uninterruptable power source unit, is disclosed by Japanese Patent Laid-Open Ko. 6-38538. This inverter control circuit is configured to detect three-phase voltages independently and control an inverter on the basis of a deviation between a mean value of the single-phase voltages subjected to full-wave rectification and a mean value (Vset) of the three-phase voltages subjected to full-wave rectification. However, this inverter control circuit is configured for voltage control only and cannot adopt the current control circuit 102 used in the conventional example shown in FIG. 8, thereby being incapable of protecting a switching element composing an inverter 1 from an overcurrent.

The conventional inverter control circuit which is configured as described above operates to cancel the three-phase unbalanced voltages when a load is connected thereto but allows a steady-state deviation to be produced due to the control response. Further, when the control circuit is to be operated by software processing and a micro computer which has a slow processing speed is adopted for implementing the control circuit at a low cost, the control response is further slowed down and the steady-state deviation is enlarged.

SUMMARY OF THE INVENTION

The present invention which has been made for solving the problem with conventional controllers has an object to provide a controller for power transducers which is capable of maintaining balanced three-phase output voltages with no influence on a current control even when an unbalanced load is connected to three-phase outputs of an inverter. Further the present invention has as another object realization of a controller for power transducers which is capable of providing stable and highly precise three-phase voltages by suppressing higher harmonic voltage components even when a non-linear load is connected.

In a first preferable aspect of the present invention, the controller for power transducers comprises voltage command value setting means for setting voltage command value to be output to each phase of a power transducer, voltage detecting means for detecting an output voltage in each phase of the power transducer, mean value detecting means for detecting a mean value of the detected output voltages, deviation control means for controlling so that a a larger deviation is output as a deviation is larger between the detected mean value and the voltage command value deviation ratio calculating means for calculating a voltage deviation ratio on the basis of a control result obtained by the deviation control means and the voltage command value and output voltage correcting means for determining a corrected output voltage by correcting the output voltage on the basis of the voltage deviation ratio, thereby controlling an output of the power transducer.

In a second preferable formation of the present invention, the controller for power transducers comprises limiter means for limiting a voltage deviation ratio calculated by the deviation calculating means below a predetermined value so that output voltage correcting means corrects an output voltage on the basis of a voltage deviation ration limited by the limiter means.

In a third preferable formation of the present invention, the controller for power transducers comprises frequency component c d value setting means for setting a component command value for components having a reference frequency to be controlled in an output voltage of a power transducer, a voltage detecting means for detecting an output voltage of the power transducers frequency component detecting means for detecting the components having the reference frequency in the detected output voltage as a DC voltage having the reference frequency, frequency component deviation control means for controlling so that a larger deviation is output as a deviation is larger between the detected DC voltage having the reference frequency and the command value for the components having the reference frequency, AC converter means for converting a control result obtained by the frequency component deviation control means into an AC control variable taking the reference frequency as standard and adding means for adding the detected output voltage to the AC control variables thereby controlling an output of the power transducer on the basis of an addition result obtained by the adding means.

In a fourth preferable formation of the present invention, frequency component deviation control means has a blind zone for a deviation between a detected DC voltage having a reference frequency and a command value for components having the reference frequency.

In a fifth preferable formation of the present invention, the controller for power transducer comprises frequency component setting means for setting a command value for components having a reference frequency to be controlled in an output voltage of a power transducers voltage detecting means for detecting an output voltage of the power transducer, normal phase dq axis component detecting means for detecting normal phase components having the reference frequency in the detected output voltage as a normal phase dq axis voltage, normal phase deviation control means for controlling so that a larger deviation is output as a deviation is larger between the positive phase dq axis voltage and the command value for the components having the reference frequency, reverse phase dq axis component detecting means for detecting reverse phase components having the reference frequency in the detected output voltage as a reverse phase dq axis voltages reverse phase deviation control means for controlling so that a larger deviation is output as a deviation is larger between the reverse phase dq axis voltage and the command value for the components having the reference frequency, reverse phase dq axis/normal phase dq axis converter means for converting a control result obtained by the reverse phase deviation control means into a normal phase dq axis voltages normal phase dq axis/AC converter means for adding a control result obtained by the normal phase deviation control means to a control result obtained by the reverse phase deviation control means which is converted into the normal phase dq axis voltage by the reverse phase dq axis/normal phase dq axis converter means and converting an addition result into a normal phase AC control variable, and adding means for adding the detected output voltage to the normal phase AC control variable, thereby controlling an output of the power transducer on the basis of an addition result obtained by the adding means.

DETAILED DESCRIPTION OF THE PREFERRED EMBODIMENTS

First Embodiment

Figure 1:
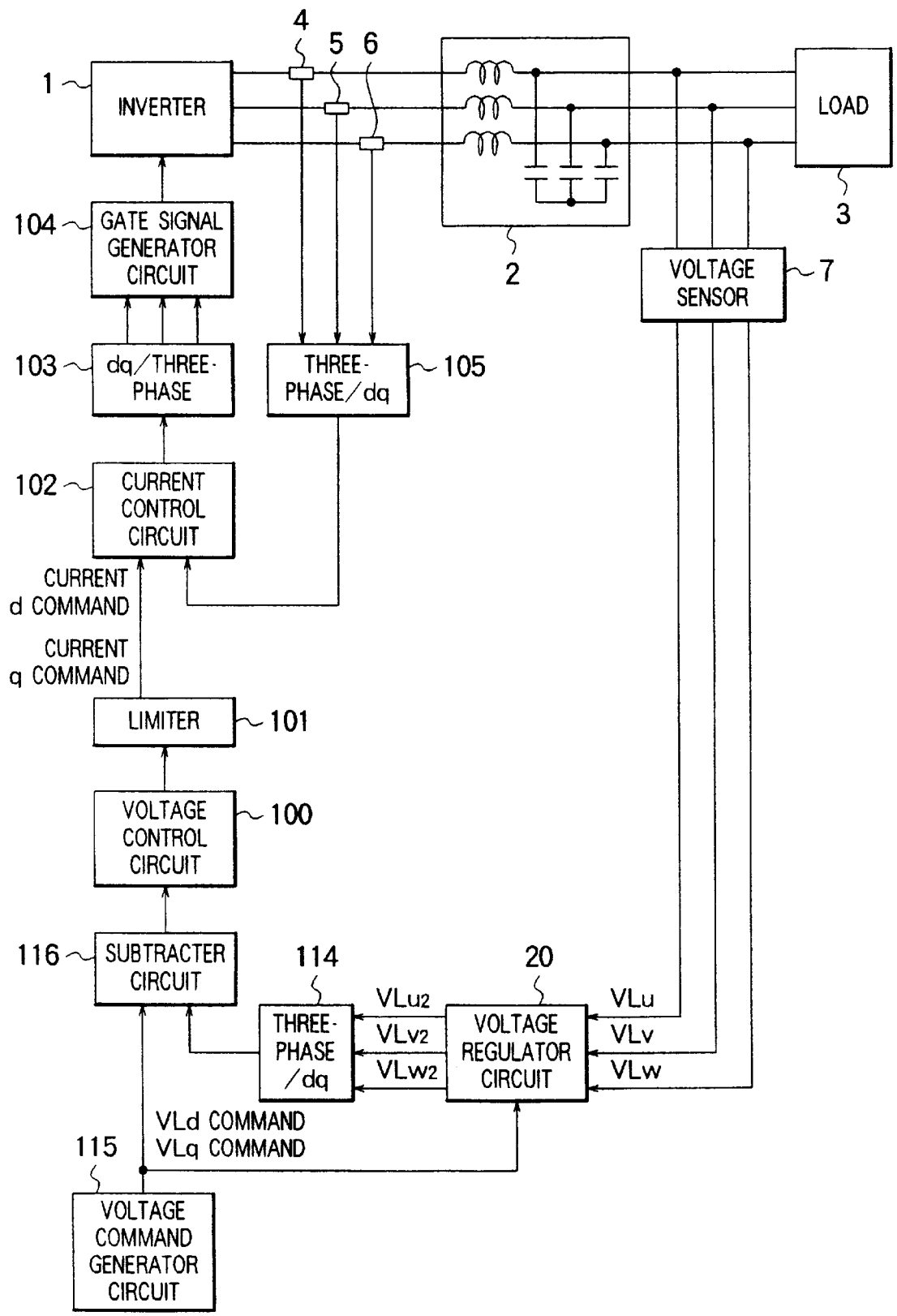
FIG. 1 is a block diagram illustrating a configuration of a first embodiment of the controller for power transducers according to the present invention.
Figure 8:
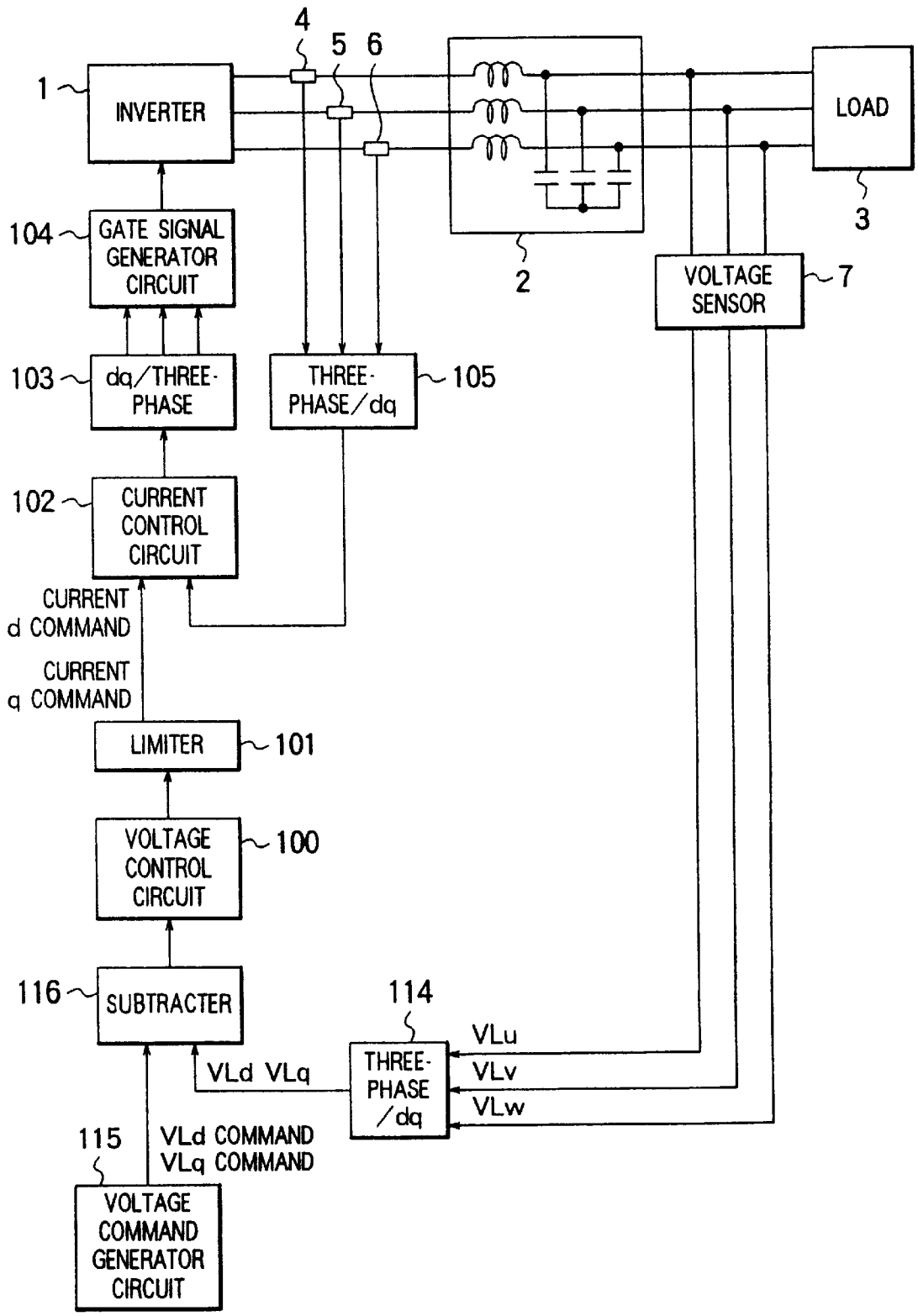
FIG. 8 is a block diagram illustrating a configuration of a conventional controller for power transducers.

Now, a first embodiment of the present invention will be described with reference to the accompanying drawings. FIG. 1 is a block diagram illustrating an overall configuration of a controller for power transducers according to the present invention. In this drawing, reference numerals which are the same as those used in FIG. 8 represent members which are the same as or correspond to those which are shown in FIG. 8. A voltage regulator circuit 20 receives, as inputs, voltages VLu, VLv and VLw of different phases output from a voltage sensor 7 as well as VLd command and VLq commands output from a voltage command generator circuit 115, thereby outputting new three-phase voltage detection values $VLu_2$, $VLv_2$ and $VLw_2$. In the other respects, the controller has a configuration which is the same as that of the conventional control circuit for instantaneous control inverters.

Figure 2:
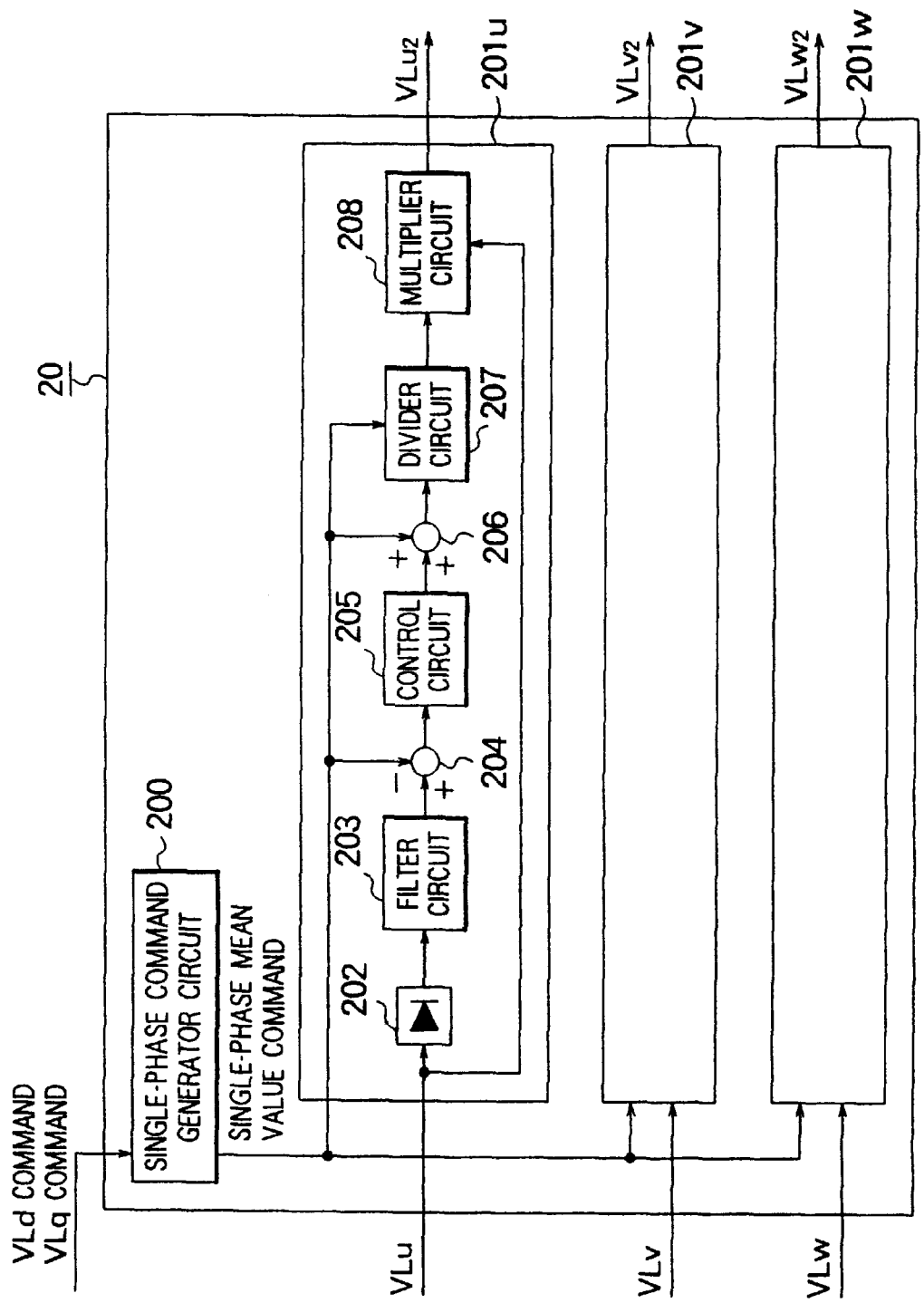
FIG. 2 is a block diagram illustrating a configuration of a voltage regulator circuit in the first embodiment of the present invention.

FIG. 2 is a block diagram illustrating a configuration of a voltage regulator circuit 20 used in the first embodiment of the present invention. The voltage regulator circuit 20 comprises a single-phase mean value command generator circuit 200 which generates a single phase mean value command for each of the u phase, the v phase and the w phase on the basis of the VLd and VLq commands output from the voltage command generator circuit 115, and unbalanced voltage ratio control circuits 201u, 201v and 201w which calculate an unbalanced voltage ratio in each of the u, v and w phases according to the single-phase mean value command.

The unbalanced voltage ratio control circuit 201u for the u phase comprises a single-phase full-wave rectifier 202 which performs full-wave rectification of u phase voltage VLu output from the voltage sensor 7, a low pass filter circuit 203 which filters the full-wave rectified output and detects a mean value per phase, a subtracter 204 which determines a deviation ratio by subtracting an output (a mean value in a single phase) of the single-phase command generator circuit 200 from an output of the low pass filter circuit 203, a control circuit 205 which performs proportional-plus-integral control as deviation control means for controlling a deviation, an adder 206 which adds an output of the control circuit 205 to the single-phase mean value command, a divider 207 which divides an output of the adder 206 by the single-phase mean value command and a multiplier 208 which multiplies an output of the divider 207 by the u phase voltage VLu.

The single-phase full-wave rectifier 202 and the low pass filter circuit 203 comprise mean value detecting means, the subtracter 204 and the control circuit 205 comprise deviation control means, the adder 206 and the divider 207 comprise deviation ratio calculating means, and the multiplier 208 comprise an output voltage correcting means. Each of unbalanced voltage ratio control circuits 201v and 201w for the v and w phases is configured similarly to the unbalanced voltage ratio control circuit 201u of u phase.

Now, description will be made of the first embodiment. The single-phase command generator circuit 200 outputs a single-phase mean value command by carrying out the following calculation:

SQR (VLd command×VLd command+VLq command× VLq command) ×Kc [wherein Kc is a gain for converting a three-phase effective value into a single-phase mean values or (2×SQR(2)/(SOR(3×π))]

In the unbalanced voltage ratio control circuit 201u, on the other hands the u phase voltage VLu is full-wave rectified by the full-wave rectifier 202 and then filtered by the low pass filter circuit 203 for detecting a mean value per phase. The mean value is sent to the subtracter 204 for subtracting the single-phase mean value. From a subtraction result, whether the mean value output from the low pass filter circuit 203 is larger or smaller than the single-phase mean value command is calculated and a calculation result is output to the control circuit 205.

On the basis of a deviation between the single-phase mean value command and the mean value, the control circuit 205 determines a deviation ratio relative to the single-phase mean value command by performing proportional-plus-integral operation. By multiplying the deviation ratio determined with the control circuit 205 by the phase voltage VLu detected with a voltage sensor 7 in the multiplier 208, it is possible to enlarge an average voltage deviation calculated by the subtracter 116. By inputting this enlarged voltage deviation ratio into the voltage control circuit 100, it is possible to obtain a large control variable. The three-phase output voltages are balanced as average by processing the voltages in the other two phases in the similar manner.

Second Embodiment

In the first embodiment described above, the unbalanced voltage ratio control circuits 201u, 201v and 201w are provided for the respective phases for balancing the three-phase voltages. When the single-phase mean value commands vary, for example, in a transient stage such as startup/shutdown time, however, a large voltage deviation ratio is detected since the control circuit 205 has an integral element, whereby actual phase voltages VLu, VLv and VLw detected with the voltage sensor 7 are largely different from the output voltages VLu2, VLv2 and VLw2 of the unbalanced voltage ratio control circuits 201u, 201v and 201w, whereby response is not favorable at the transient stage until the differences are cancelled.

Figure 3:
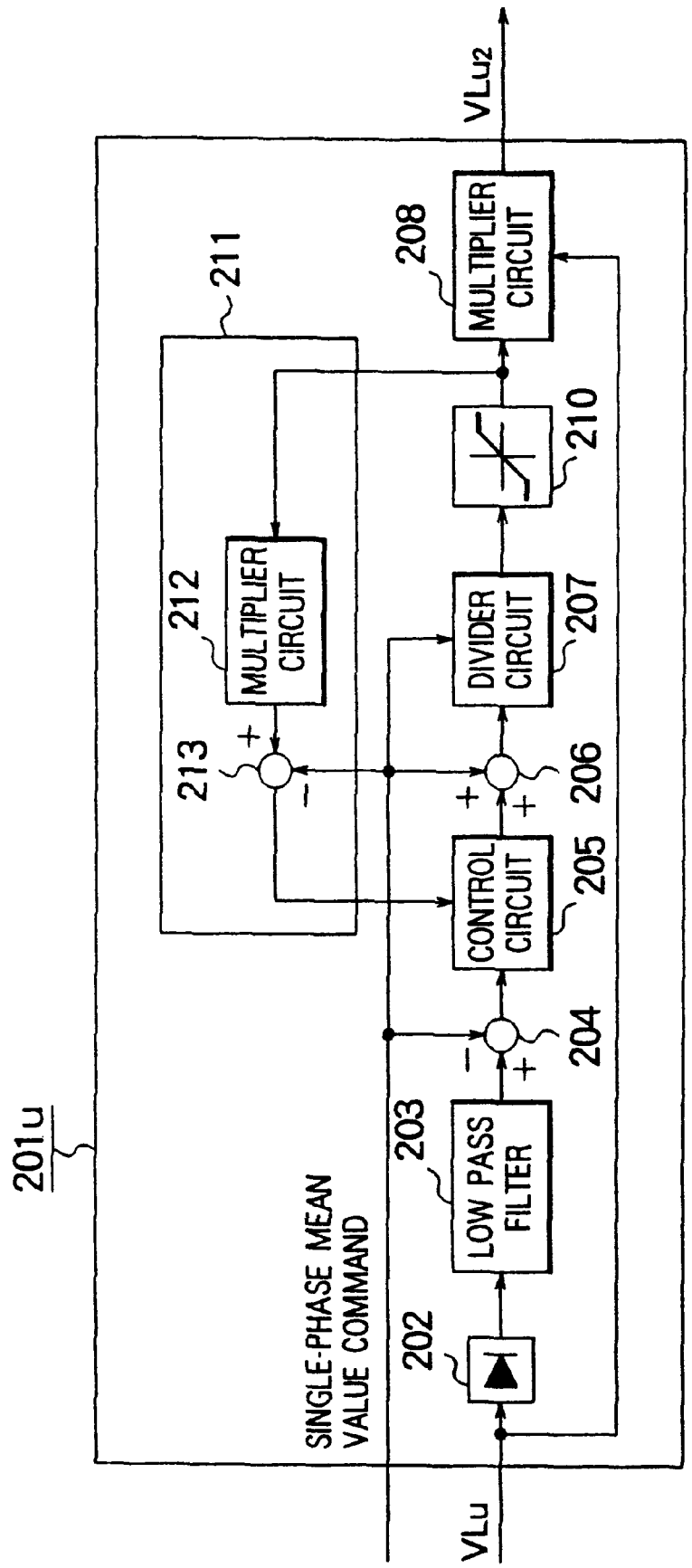
FIG. 3 is a block diagram illustrating a configuration of an unbalanced voltage ratio control circuit for a single phase in a voltage regulator circuit in a second embodiment of the present invention.

Therefore, a limiter circuit 210 is disposed as limiter means on the output side of a divider 207 as shown in FIG. 3 so that a division result is input through a limiter circuit 210 into a multiplier 208. In this embodiment, the limiter circuit 210 sets a limit level so as to define a range desired for steady-state control (a range slightly broader than a steady-state voltage unbalance ratio produced by control only with a voltage control circuit 100, for example, 5%) and limit a value to be multiplied by a single-phase voltage detection value.

As a result, the differences between the transient voltages are minimized, thereby enhancing control performance. Further, an inverse operation circuit 211 which is composed of a multiplier 212 and a subtracter 213 is disposed between an output side of the limiter circuit 210 and a control signal input side of a control circuit 205 so that relationship in the output of the limiter circuit 210 is coincident with that in the output of the control circuit 205.

The inverse operation circuit 211 performs processing reverse to that carried out at the stages from the control circuit 205 to the limiter circuit 210, thereby being capable of preventing an integral circuit from overshooting in the control circuit 205 when the limiter circuit is actuated and enhancing performance at the transient stage. However, the inverse operation circuit 211 is unnecessary for a control circuit 205 which comprises no integral element, for example, a control circuit 205A used in a sixth embodiment described later Operations of the circuits will be described in detail When an output deviation obtained as a control result of the control circuit 205 is represented by A and the single-phase mean value command is designated by B, the adder 206 provides an output C=A+B. This output C is input into the divider 207 and D=(A+B)/B is output from the divider 207 to the limiter circuit 210.

The output D is fed into the limiter circuit 210 and output as E=Limit (A+B)/B). The inverse operation circuit 211 multiplies the output E of the limiter circuit 210 by B, and the subtracter 213 subtracts the single-phase mean value command B and returns an output AA=Limit [A] to the control circuit 205.

By these operations, the deviation output of the control circuit 205 is corrected to AA=Limit [A] and has relationship coincident with that in the output E of the limiter circuit 210, thereby preventing the integral circuit from overshooting in the control circuit 205.

Third Embodiment

In each of the first and second embodiments, the unbalanced voltage ratio circuits 201u, 201v and 201w are provided for the respective phases for balancing the three-phase voltages. In this circuit configuration, however, components having frequencies other than a reference frequency are eliminated by the single-phase full-wave rectifier 202 and the low pass filter circuit 203. As a result, the voltages comprising components having the reference frequency can be balanced only as an average among the three phases.

Figure 4:
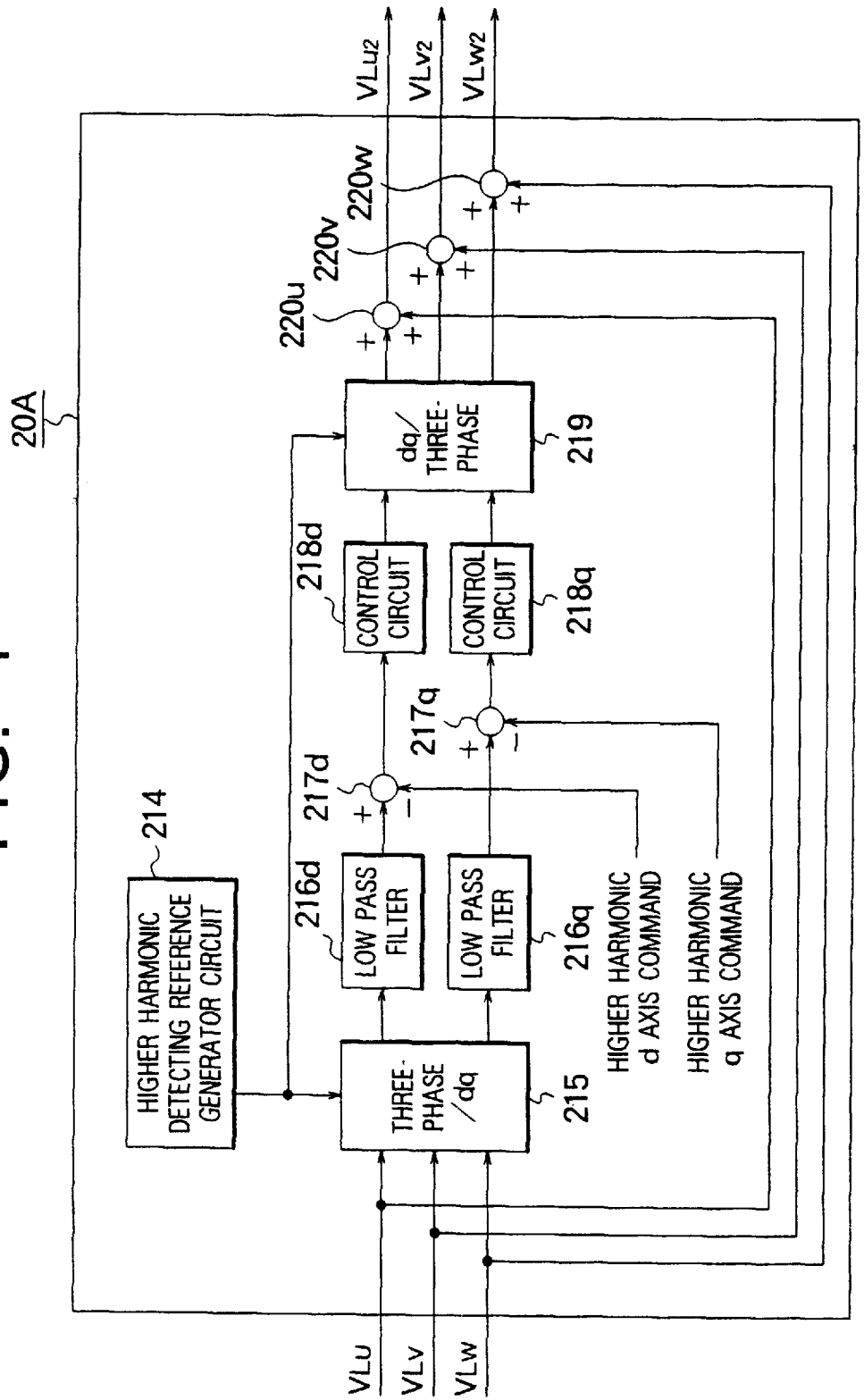
FIG. 4 is a block diagram illustrating a configuration of a voltage regulator circuit in a third embodiment of the present invention.

Therefore, a voltage regulator circuit 20A shown in FIG. 4 is used for correcting optional higher harmonic components having the reference frequency and other frequencies.

A voltage regulator circuit 20A comprises a higher harmonic detecting reference frequency generator circuit 214 as frequency component command setting means for generating a reference frequency which is a higher harmonic to be restricted, a higher harmonic normal phase three-phase/dq axis converter circuit 215 as frequency component detecting means which converts the three-phase voltages VLu, VLv and VLw detected by the voltage sensor 7 into a d axis voltage VLd and a q axis voltage VLq having the reference frequency and normal phase of the reference frequency components according to the reference signal of a higher harmonic detection reference generator circuit 214, low pass filters 216d and 216q which take out the d axis voltage VLd and q axis voltage VLq of the reference frequency components as DC currents, subtractors 217d and 217q which subtract the higher harmonic d axis command and q axis command respectively (these commands being ordinarily 0 for allowing no higher harmonics to be output) from the DC outputs from the low pass filters 216d and 216q, control circuits 218d and 218q as frequency component deviation control means for determining, from deviations obtained as subtraction results, correction variables for restricting the reference frequency components in frequency components of the three-phase voltages VLu, VLV and VLw, a higher harmonic positive phase dq axis/three phase converter circuit 219 as AC converter means for converting the correction variables represented by the d axis voltage VLd and the q axis voltage VLq into the initial three-phase voltages, and adders 220u, 220v and 220w as adding means for adding the correction variables output from the higher harmonic normal phase dq axis/three-phase converter circuit 219 to the three-phase voltages VLu, VLv and VLw. In the voltage regulator circuit 20A, a specific higher harmonic control circuit is composed of the circuits other than the adders 220u, 220v and 220w.

Three-phase output voltages VLu$_2$, VLv$_2$ and VLw$_2$ are output to a three-phase/dq axis converter circuit 114 (not shown) as shown in FIG. 1 and converted into a d axis voltage VLd and an q axis voltage VLq having the reference frequency and normal phase.

Description will be made of operations of the third embodiment.

The three-phase voltages VLu, VLv and VLw detected with the voltage sensor 7 are input into the higher harmonic normal phase three-phase/dq axis converter circuit 215, and converted into the d axis voltage VLd and q axis voltage VLq having the reference frequency and normal phases.

At this stage, a reference frequency to be restricted is transmitted from the higher harmonic detecting reference frequency generator circuit 214 to the higher harmonic normal phase three-phase/dq converter circuit 215, and three-phase voltages VLu, VLv and VLw at the reference frequency are converted into d axis voltage VLd and q axis voltage VLq having the reference frequency and normal phases.

The converted d axis voltage VLd and q axis voltage VLq having the reference frequency and normal phases are filtered by the low pass filters 216d and 216q, and taken as DC components. The subtractors 217d and 217q subtract the higher harmonic d axis command and q axis commands (these command being ordinarily 0 since higher harmonics are not output) from the outputs of the low pass filters 216d and 216q, thereby determining deviation variables.

These deviation variables are input into the control circuits 218d and 218q, whereby correction variables are determined from these deviations for restricting reference frequency values in frequency components of the three-phase voltages VLu, VLV and VLw. These determined correction variables are converted into the three-phase voltages in the higher harmonic normal phase dq axis/three-phase converter 219, and input into the adders 220u, 220v and 220w respectively The adders 220u, 220v and 220w add the three-phase voltages output from the higher harmonic positive phase dq axis/three-phase converter 219 to the three-phase voltages VLu, VLv and VLv respectively. As a results the frequency components of the three-phase voltages VLu, VLv and VLw which are to be restricted are enlarged and input into the subtracter circuit 116. The subtracter circuit 116 outputs the frequency components to be restricted as a large deviation to the control circuit 110. Since a large correction variable is output from the control circuit 110E the third embodiment is capable of restricting specific higher harmonic components.

Fourth Embodiment

In the third embodiment described above, the voltage regulator circuit 20A is configured to reduce the specific higher harmonic components. However, it is possible to eliminate various frequency components from the three-phase voltages VLa, VLv, and VLw by configuring a voltage regulator circuit 20B to include a plurality of specific frequency component control circuits 225 and 226 as shown in FIG. 5.

However, blind zone circuits 223d and 223q are disposed at stages before control circuits 218d and 218q as blind zone setting means which operate only when a deviation exceeding a certain magnitude is produced between higher harmonic d axis command, a q axis command and Dc values of reference frequency components output from the low pass filters 216d, 216q.

Figure 5:
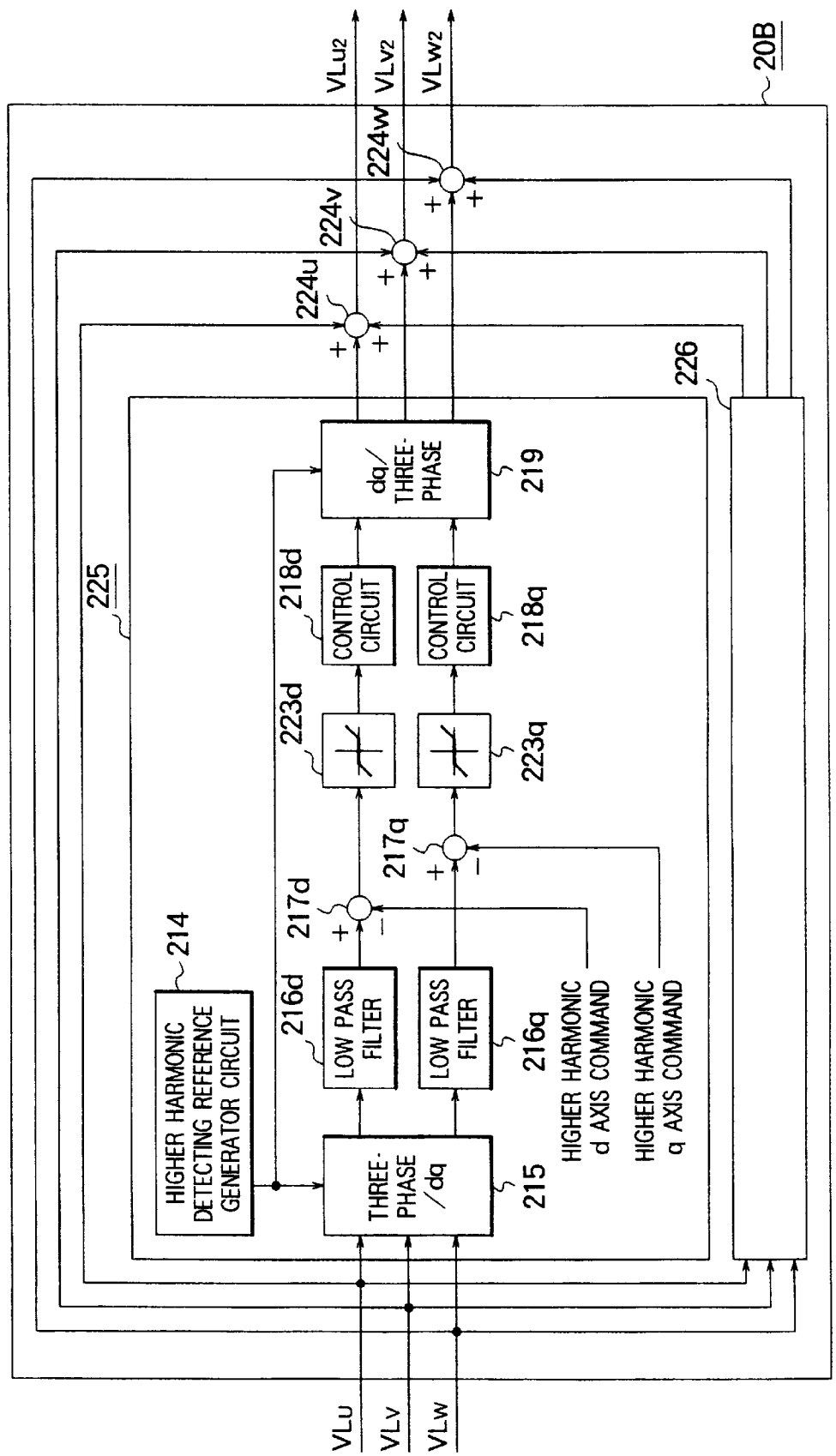
FIG. 5 is a block diagram illustrating a configuration of a voltage regulator circuit in a fourth embodiment of the present invention.

FIG. 5 shows an example wherein the voltage regulator circuit 20B includes two specific higher harmonic control circuits 225 and 226. Each of the specific higher harmonic control circuits 225 and 226 calculates a correction variable for restricting a specific higher harmonic component from each of the three-phase voltages VLu VLV and VLw, converts the correction variable into three-phase voltages with a higher harmonic normal phase dq axis/three-phase converter 219, and outputs these voltages to adders 224u, 224v and 224w.

The adders 224u, 224v and 224w add correction variables output from the specific higher harmonic control circuits 225 and 226 to the three-phase voltages VLu. VLv and VLw, and output detection values of new three-phase voltages VLu2, VLv2 and VLw2. As a result, two kinds of higher harmonic components are eliminated from the initial three-phase voltages VLu, VLv and VLw.

When the voltage regulator circuit 20B includes the plurality of specific higher harmonic control circuits 225 and 226, interference may occur between the circuits if components of control frequency for the other circuit are not eliminated completely. When the specific frequency control circuits 225 and 226 are configured as circuits for controlling higher harmonics of the fifth and seventh order respectively, for example, the higher harmonic control circuit 225 for the fifth order cannot eliminate higher harmonic components of the seventh order completely, whereby DC components output from the low pass filters 216d and 216q contain same higher harmonic components of the seventh order.

Similarly, the higher harmonic control circuit 226 for the seventh order cannot eliminate higher harmonic components of the fifth order completely, whereby DC components output from low pass filters (not shown) contain same higher harmonic components of the fifth order. Accordingly, interference may occur between the control circuits 225 and 226 when the blind zones are not included since the voltage regulator circuit 20B operates to cancel the higher harmonic components of the seventh order which are allowed to mix by the higher harmonic control circuit 225 for the fifth order and the higher harmonic components of the fifth order allowed to mix by the higher harmonic control circuit 226 for the seventh order.

Therefore, the blind zone circuits 223b and 223q are included for eliminating interfering components by allowing higher harmonics of a certain degree. Accordingly, an inverter can be controlled to satisfy a guideline, etc. on the load side.

Fifth Embodiment

In each of the third embodiment and the fourth embodiment, only higher harmonic components which are produced commonly to the three phases can be converted into a direct current by the higher harmonic normal phase dq axis converter circuit. When a single-phase load is connected to the three-phase output inverter circuit, the load is connected only to two wires, thereby producing higher harmonics unbalanced in the three phases.

Figure 6:
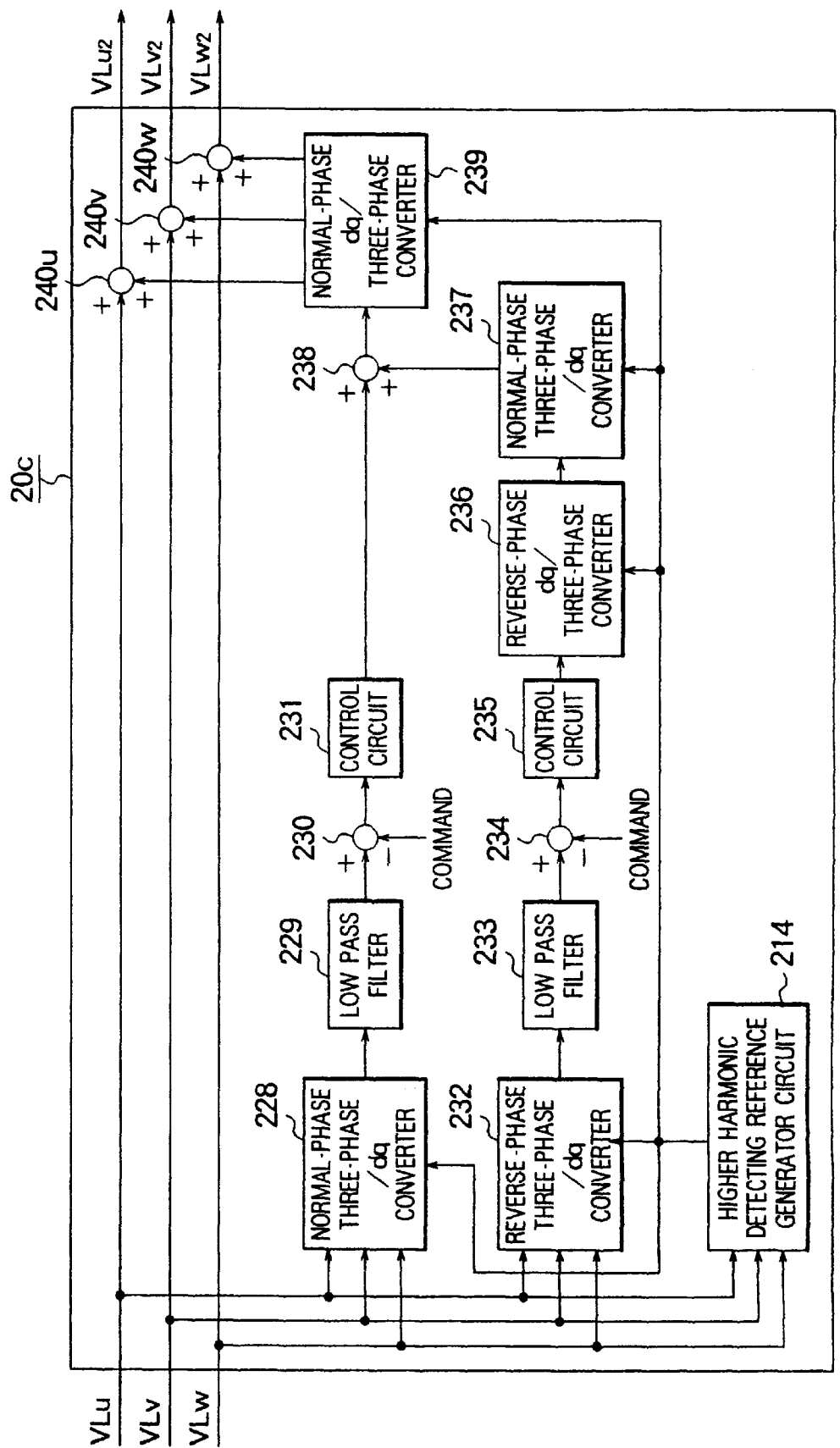
FIG. 6 is a block diagram illustrating a configuration of a voltage regulator circuit in a fifth embodiment of the present invention.

Since the positive phase d–q axis conversion does not permit detecting components unbalanced in the three phases as DC components as generally known, the fourth embodiment cannot suppress higher harmonics unbalanced in the three phases, or cannot perform favorable inverter control. FIG. 6 shows a specific higher harmonic control circuit 20C which suppresses higher harmonics produced in such a case.

In FIG. 6, a higher harmonic normal phase three-phase/dq axis converter circuit 228 converts frequency components produced from higher harmonic normal phase components of the three-phase voltages VLu, VLv, and VLw by a higher harmonic detection reference generator circuit 214 in normal phase d and q axis components according to a transformation shown below. Since the positive phase d and q axis components contain components other than target frequency positive phase components as AC components, AC components are eliminated by a low pass filter 229 and target frequency normal phase components which are converted into DC components are taken out. The target frequency normal phase components which are converted into the DC components and output through the low pass filter 229 are input into a subtracter 230 for calculating a deviation from a higher harmonic component command. On the basis of this deviation, a control circuit 231 determines a correction variable for suppressing specific higher harmonic components in the three-phase normal phase voltages VLu, VLv and VLw.

$$\begin{pmatrix} V_{Ld} \\ V_{Lq} \\ 0 \end{pmatrix} = \sqrt{\frac{2}{3}} \begin{bmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \\ 1/\sqrt{2} & 1/\sqrt{2} & 1/\sqrt{2} \end{bmatrix} \begin{bmatrix} V_{LU} \\ V_{LV} \\ V_{LW} \end{bmatrix}$$

(Equation)

Then, a higher harmonic reverse phase three-phase/dq axis converter circuit 232 converts higher harmonic components produced from higher harmonic reverse phase components of the three-phase voltages VLu, VLv and VLw by a higher harmonic detection reference generator circuit 214 into reverse phase d and q axis components according to a transformation shown below. Since the reverse phase d and q axis components contain components other than target frequency reverse phase components as AC components, the AC components are eliminated by a low pass filter 223 and the target frequency reverse phase components which are converted into DC components are taken out. The target frequency reverse phase components which are output through the low pass filter 233 and converted into the DC components are input into a subtracter 234 for calculating a deviation from a higher harmonic component command. On the basis of this deviation, a control circuit 235 determines correction variables for suppressing specific higher harmonic components in the three-phase reverse phase voltages VLu, VLv and VLw.

$$\begin{pmatrix} V_{Ld} \\ V_{Lq} \\ 0 \end{pmatrix} = \sqrt{\frac{2}{3}} \begin{bmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \\ 1/\sqrt{2} & 1/\sqrt{2} & 1/\sqrt{2} \end{bmatrix} \begin{bmatrix} V_{LU} \\ V_{LV} \\ V_{LW} \end{bmatrix}$$

(Equation)

The correction variables which are output from the control circuit 235 in the forms of the converted into the d and q axis components returned to the three-phase voltages by a higher harmonic reverse phase dq axis/three-phase converter circuit 236 and then converted into positive phase dq axis components by a higher harmonic positive phase three-phase/dq axis converter circuit 237. The converted positive phase dq axis components are added to positive phase dq axis components output from the control circuit 231 by an adder 238 and then converted into three-phase voltages by a higher harmonic positive phase dq axis/three-phase converter 239. The three-phase voltages which are converted by the higher harmonic positive phase dq axis/three-phase converter 239 are added to the three-phase voltages VLu, VLV and VLw by adders 240u, 240v and 240w used as adding means.

Now, operations of the fifth embodiment will be described. Frequency components which are uniform among the three phases are complete DC components when converted into normal phase dq axis. When a load voltage of a single-phase load is converted into three-phase dq axis, however, DC components and higher harmonic components twice as high are produced. When a load current of a single-phase load is converted into three-phase reverse phase dq axis, on the other hand, the DC components and higher harmonic components twice as high which are produced by the positive phase conversion are higher harmonic components twice as high and DC components.

In the fifth embodiment, normal higher harmonic components and reverse phase higher harmonic components from the three-phase voltages VLu, VLv and VLw are detected with the higher harmonic normal phase three-phase/dq axis converter circuit 228 and the higher harmonic reverse three-phase/dq axis converter circuit 232, and higher harmonics twice as high as these normal phase and reverse phase components are filtered by the low pass filters 229 and 233, thereby preventing mutual interference.

In each of the phases, a deviation from the higher harmonic dq command is determined by the subtracters 230 and 234, and the control circuits 231 and 235 perform control functions to determine correction variables on the basis of this deviation. However, an output of the control circuit 235 which is a control result obtained by the reverse phase control is converted into positive phase dq axis components by passing the output through the higher harmonic reverse phase dq axis/three-phase converter circuit 236 and the higher harmonic normal phase three-phase/dq axis converter circuit 237 since the fifth embodiment is configured for a positive phase control as a whole.

The adder 238 adds an operation result of the control circuit 231 to an operation result which is converted into positive phase dq axis components output from the higher harmonic normal phase thee-phase/dq axis converter circuit 237, and the higher harmonic positive phase dq axis/three-phase converter circuit 239 returns an addition result to the three-phase voltages as an operation results The adders 240u, 240c and 240w add the operation result output from the higher harmonic positive phase dq axis/three-phase converter circuit 239 to the three-phase voltages VLu, VLv and VLw, to prepare new three-phase voltage values $VLu_2$, $VLv_2$ and $VLw_2$. Accordingly, higher harmonic components which are unbalanced among the three phases are eliminated.

The fifth embodiment which is configured as described above is capable of controlling reference frequency components so as to be balanced among the three phases by using a reference frequency of the higher harmonic detection reference generator circuit 214 as a fundamental frequency. Further, the fifth embodiment is capable of eliminating all components unbalanced among the three phases and higher harmonic components to be controlled by composing a new circuit of a plurality of circuits.

Sixth Embodiment

Figure 7:
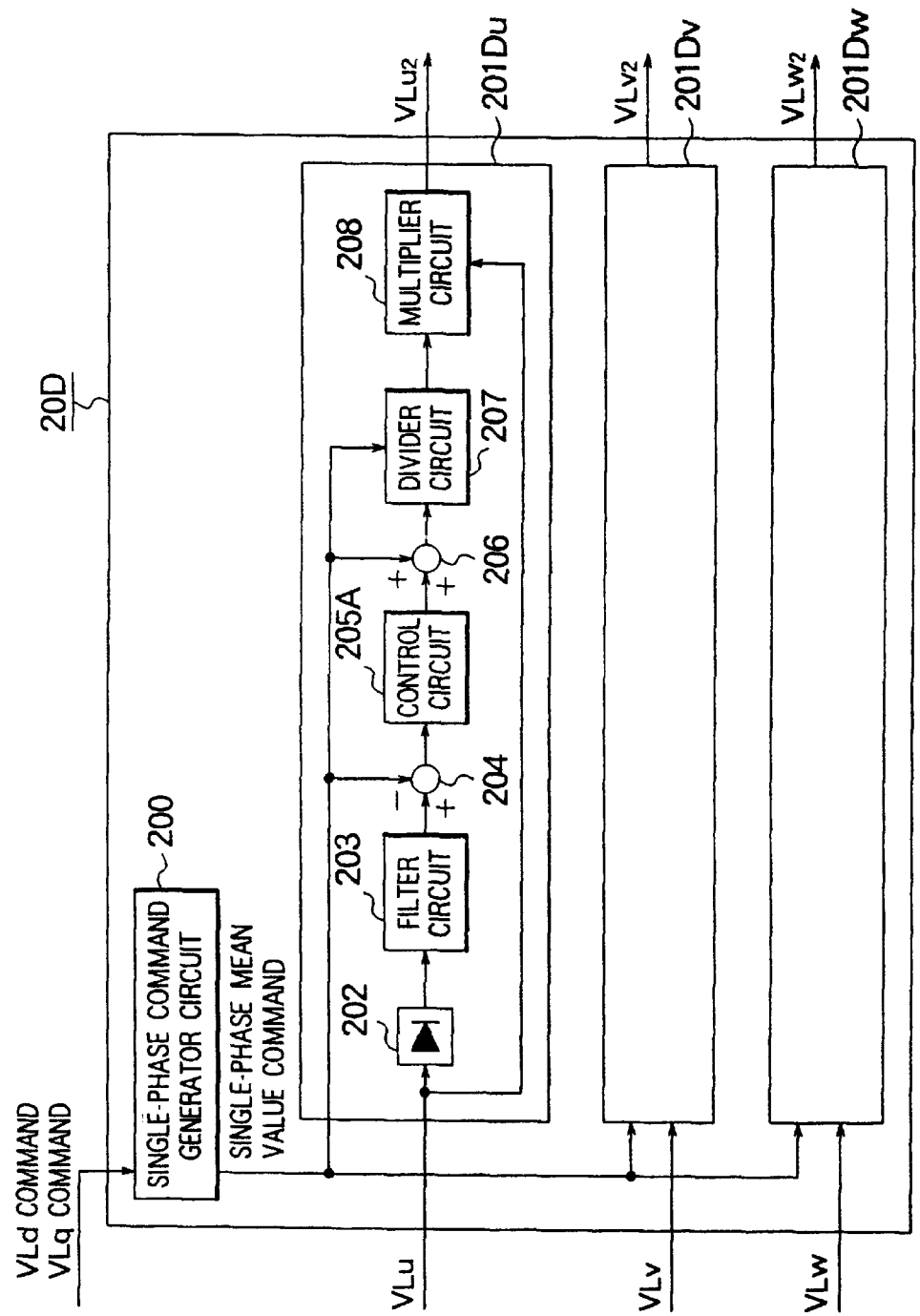
FIG. 7 is a block diagram illustrating a configuration of a voltage regulator circuit in a sixth embodiment of the present invention.

FIG. 7 is a block diagram illustrating a configuration of a voltage regulator circuit preferred as another embodiment of the present invention In this drawing, a voltage regulator circuit 20D comprises a control circuit 205A as deviation ratio control means. The control circuit 205A outputs as a proportional control result a deviation expressed by the following formula:

$$OUT = Kp \times IN$$

(wherein the reference symbol Kp (Kp>1) represents a proportional gain and the reference symbol IN designates an input (deviation value) to the control circuit 205A.)

In this embodiment, a proportional control gain is adjusted so as to obtain a steady-state deviation which satisfies a voltage balance ratio and a voltage distortion ratio set as targets, thereby producing no steady-state deviation between a voltage command an actual voltage. The control result obtained by the control circuit 205A, or the deviation OUT, is output to an adder 206 and added to a single-phase mean value command A divider 207 calculates {(OUT+single-phase mean value command)/single-phase mean value} by dividing the output of the adder 206 by a single-phase mean value command. A multiplier 208 multiplies an output of the divider 207 by a u-phase voltage VLu.

Other components of the voltage regulator circuit 20D are similar to those shown in FIG. 2 and will not be described in particular.

In the voltage regulator circuit 20D configured as described above, the control circuit 205A outputs a larger deviation OUT as the deviation input IN is larger.

When IN=0.8 and Kp=5, for example, deviation OUT=4, whereby deviation OUT magnified five times as large is output.

On the basis of this control result, a deviation ratio is calculated by the adder 206 and the divider 207. When the single-phase mean value command is 100 [V], for example, the deviation ratio has the following value:

Deviation ratio=(4+100)/100=1.04

By multiplying a phase voltage VLu (100+0.8=100.8 [V]) detected with the sensor 7 using a multiplier 208, the following value is calculated as a corrected or new detection voltage VLuc:

$VLuc = 100.8 \times 1.04 \approx 104.8$ [V]

The sixth embodiment operates to enhance an apparent sensitivity of the sensor 7, thereby improving equilibrium degree of a three-phase output voltage.

What is claimed is:

1. A controller for power transducers comprising:

a voltage command generator for generating a d axis voltage command value and a q axis voltage command value;

a voltage sensor for detecting output voltages of each of three phases of three-phase power transducer and outputting first, second, and third voltage detection signals indicative of the output voltages of each of first, second, and third phases;

a voltage regulator coupled to said voltage command generator and said voltage sensor, said voltage regulator including:

a single-phase command value generator circuit for generating a single-phase mean value command signal based on the d axis voltage command value and the q axis voltage command value;

mean value detecting means for detecting a mean value of each of the first, second, and third voltage detection signals;

first, second, and third subtracters for subtracting the single-phase mean value command signal from the mean value of each of the first, second, and third voltage detection signals to produce first, second, and third difference values;

first, second, and third proportional-plus-integral (PI) controllers coupled to the first, second, and third subtracters for producing first, second, and third PI-compensated difference signals;

first, second, and third adders for adding the first, second, and third PI-compensated difference signals to the single-phase mean value command signal to produce first, second, and third sums;

first, second, and third dividers for dividing the first, second, and third sums by the single-phase mean value command signal to produce first, second, and third deviation ratios relative to the single-phase mean value command signal; and first, second, and third multipliers for multiplying the first, second, and third deviation ratios by the first, second, and third voltage detection signals to produce first, second, and third increased deviation ratios;

a first three-phase/dq converter coupled to said voltage regulator for converting the first, second, and third increased deviation ratios to a d axis signal and a q axis signal; and a fourth subtracter for determining a first difference between the d axis signal and the d axis voltage command value and a second difference between the q axis signal and the q axis voltage command value.

2. The controller for power transducers as claimed in claim 1 wherein said voltage regulator comprises limiter means coupled to said first, second, and third dividers for limiting the first, second, and third deviation ratios calculated by said first, second, and third dividers to less than a predetermined value and wherein said first, second and third multipliers produce the first, second, and third increased voltage deviation ratios based on the first, second, and third voltage deviation ratios limited by said limiter means.

3. The controller for power transducers as claimed in claim 1 comprising:

a voltage control circuit coupled to said fourth subtracter for outputting a current d command and a current q command based on the first and second difference values;

a limiter for limiting the current d command and the current q command based on maximum passage current values;

first, second, and third current sensors for sensing inverter currents in each of the first, second, and third phases of the power transducer;

a second three-phase/dq converter for converting the inverter currents into a d axis current signal and a q axis current signal;

a current control circuit for producing a current control signal based on the current d command, the current q command, the d axis current signal, and the q axis current signal;

a dq/three-phase converter for converting the current control signal into a three-phase inverter output current command; and a gate signal generator circuit for generating a gate signal and outputting the gate signal to the power transducer based on the three-phase inverter output current command.

4. A controller for power transducers comprising:

a voltage sensor for detecting output voltages in each of three phases of a three-phase power transducer and outputting first, second, and third voltage detection signals based on the output voltages of first, second, and third phases;

a voltage regulator coupled to said voltage sensor, said voltage regulator including a first higher harmonic control circuit for eliminating first frequency components from the output voltages, the first higher harmonic control circuit including:
frequency component command value setting means for setting a command value indicative of the first frequency to be controlled in the output voltages;

a first three-phase/dq converter receiving the first, second, and third voltage detection signals and the command value and for outputting a d axis voltage signal and a q axis voltage signal having the first frequency;

first and second low-pass filters for converting the d axis voltage signal and the q axis voltage signal into first and second DC voltages indicative of the first frequency;

a first subtracter for subtracting a hither harmonic d axis command value from the first DC voltage to produce a d axis deviation variable;

a second subtracter for subtracting a higher harmonic q axis command value from the second DC voltage to produce a q axis deviation variable;

a first control circuit for producing a d axis correction variable for restricting the first frequency in the output voltages based on the d axis deviation variable;

a second control circuit for producing a q axis correction variable for restricting the first frequency in the output voltages based on the q axis deviation variable;

AC converter means for converting the d axis and q axis correction variables into first, second, and third AC control variables based on the first frequency; and adding means for adding the first, second, and third voltage detection signals to the first, second, and third AC control variables to produce first, second, and third modified voltage detection signals having increased values at the first frequency:

a second three-phase/dq converter coupled to said voltage regulator for converting the first, second, and third modified voltage detection signals to a d axis signal and a q axis signal; and a third subtracter for determining a first difference between the d axis signal and the higher harmonic d axis command value and a second difference between the q axis signal and the higher harmonic q axis command value.

5. The controller for power transducers as claimed in claim 4 wherein said voltage regulator comprises a second higher harmonic control circuit for eliminating a second frequency from the output voltages of the power transducer, wherein the first higher harmonic control circuit includes first and second blind zone circuits coupled to said adding means for filtering components having the second frequency from the first and second DC voltages.

6. The controller for power transducers as claimed in claim 4 comprising:

a voltage control circuit coupled to said third subtracter for outputting a current d command and a current q command based on the first and second difference values;

a limiter for limiting the current d command and the current q command based on maximum passage current values;

first, second, and third current sensors for sensing inverter currents in each of the first, second, and third phases of the power transducer;

a third three-phase/dq converter for converting the inverter currents into a d axis current signal and a q axis current signal;

a current control circuit for producing a current control signal based on the current d command, the current q command, the d axis current signal, and the q axis current signal;

a three-phase/dq converter for converting the current control signal into a three phase inverter output current command; and a gate signal generator circuit for generating a gate signal and outputting the gate signal to the power transducer based on the three-phase inverter output current command.

7. A controller for power transducers comprising:

frequency component setting means for setting a command value for components having a reference frequency to be controlled in an output voltage of a power transducer;

voltage detecting means for detecting the output voltage of the power transducer;

normal phase dq axis component detecting means for detecting components having a normal phase at the reference frequency in the output voltage as a normal phase dq axis voltage;

normal phase deviation control means for enlarging a difference between the normal phase dq axis voltage and the command value for the components of the output voltage having the reference frequency to produce a first control result;

reverse phase dq axis component detecting means for detecting components having a reverse phase at the reference frequency in the output voltage as a reverse phase dq axis voltage to produce a second control result;

reverse phase deviation control means for increasing a difference between the reverse phase dq axis voltage and the command value for the components having the reference frequency to produce a third control result;

reverse phase dq axis/positive axis dq axis converter means for converting the third control result into a normal phase dq axis voltage to produce a fourth control result;

normal phase dq axis/AC converter means for adding the first control result to the third control result to produce a sum converted into the normal phase dq axis voltage and converting the sum into a normal phase AC control variable utilizing the reference frequency as a standard; and adding means for adding the output voltage to the normal phase AC control variable to produce an addition result, wherein said controller controls an output of the power transducer on the basis of the addition result produced by said adding means.

* * * * *